June 26, 1962    W. U. McCOLLOUGH    3,040,939
VALVE FOR HOPPERS AND THE LIKE
Filed Feb. 26, 1960    2 Sheets-Sheet 1

INVENTOR
WILLIAM U. McCOLLOUGH
BY
ATTORNEY

June 26, 1962 W. U. McCOLLOUGH 3,040,939
VALVE FOR HOPPERS AND THE LIKE
Filed Feb. 26, 1960 2 Sheets-Sheet 2

INVENTOR
WILLIAM U. McCOLLOUGH
BY Patrick D. Henry
ATTORNEY

United States Patent Office 3,040,939
Patented June 26, 1962

3,040,939
VALVE FOR HOPPERS AND THE LIKE
William U. McCollough, P.O. Box 2064, Albany, Ga.
Filed Feb. 26, 1960, Ser. No. 11,340
7 Claims. (Cl. 222—503)

This invention relates to a valve for hoppers and the like and particularly to a double gate valve assembly for grain hoppers and the like with selective cam control for either or both of said gates. One or more of the present valves may be arranged on the bottom of a hopper or the like for independent or collective and selective operation.

The problem of emptying large hoppers or bins of commodities such as grain, peanuts and the like, is one largely of controlling the flow and managing the flow in such a manner as to deliver what is desired and what can be accommodated in the conveyor and further down the line. In a large bin or hopper which is substantially full of the commodity, the weight at the bottom is tremendous in many instances and there is a positive tendency for the weight of the commodity to force large quantities through the valve once the valve is opened. It is difficult ot regulate the flow and to control the commodity in the conveyor or on further down the line. It is much simpler to have some sort of positive, adjustable and selective valve control for the hopper which permits any desired quantity of feeding and which allows fine control with really selective operation.

In addition, the cost factor of the valves and bins must be considered since it is not possible to construct and sell complicated or complex electro-mechanical devices and the like which require power sources and maintenance and other things making the cost and maintenance prohibitive to the average grain storage or bin operator. Accordingly, in addition to the aforementioned problems and desirable characteristics in the particular field, such devices must be economical and easily maintained over a long period of time.

The present invention provides a purely mechanical hopper valve control and double-gate arrangement which permits accurate, positive and completely selective control in the open and closed position and which lends itself to be arranged with other structures of identical construction into gangs or groups of such devices all located along the bottom of the same hopper or bin.

Generally described, without restriction on the scope of my invention found in the appended claims and with no particular use of patent terminology, the present device is a valve structure to be bolted or otherwise attached onto the bottom of a grain bin or hopper which slopes towards the valve and which employs any sort of positive delivery arrangement so that when the valve is opened the commodity such as peanuts or grain within the bin will be delivered into the valve. There is formed by a number of metal plates or the like a valve housing somewhat in the form of a small size hopper having sloped sides constructed from elongated metal plate and having end closure plates with an open top and an open bottom. The top of the valve housing is attached as by bolting or welding to the open bottom of the grain bin and the bottom of the valve structure is attached or positioned closely adjacent to the open top of a tubular housing of a screw-type conveyor apparatus or any other conveyor apparatus for removing the commodity from the bottom of the valve as it falls therefrom. An elongated support rod is attached longitudinally across the open top of the valve housing and movably mounted upon this support rod is a pair of gate members, one extending from the center support rod outwardly to the side of the valve housing and the other extending from the support rod outwardly to the opposite side of the valve housing whereby the two gates together cover the valve housing interior. The gate arrangement resembles a hinge with the two gates representing the two hinge plates and with the center support pin representing the pintle of the hinge. The present gates are attached to the center support rod in the same manner as is found in a hinge, that is, through the use of interlocking collars formed on the end of the gates. Mounted below the gate and running substantially parallel thereto along the longitudinal center of the valve housing is a tubular valve control rod supported in each end of the end plates of the valve housing and there being fastened on said support rod a valve gate control cam comprising a cam plate constructed as a segment of the arch of a circle and having the cam face thereof selectively engageable with either of the two valve gates. There may be as many of these cams as desired to properly engage and close the respective gates. The valve cam control rod extends outwardly from both ends of the valve housing and has a control gear attached thereto so that rotation of the gear turns the valve control shaft thereby engaging the valve cams against one or the other or both of said gates. The gear is controlled by means of a tooth segment control member formed in a semicircular manner and being rotatably mounted on a shaft near the gear and having a control handle affixed thereto. Shifting of the handle causes the tooth segment to turn the gear selectively in one direction or the other thereby actuating the cam members against the gates. Additional valves of identical construction may be placed at spaced intervals along the bottom of the hopper and, in accordance with the present novel arrangement, the control rods for the respective additional valves may be run through the hollow control rods of the other valves so that independent control of each of the valve structures is possible from the same general control station which may be located at one end of the delivery conveyor.

A primary object of this invention is to provide a hopper valve structure which employs two gates within the valve, each selectively controlled independently of the other or both being controlled together by the same cam control mechanism.

A further object of this invention resides in the particular arrangement of the cams on the control shaft and in the control of the cam shaft by means of a gear and a semi-circular tooth control segment arrangement.

Another object of this invention is found in the use of two or more of the same identical valve structure arranged in linear and longitudinal relationship so that the controls for one are placed through the other in such a manner as all valves may be controlled from the same general location.

A further object of my invention resides in the employment of two separate and gravity operated gate members inside the valve housing in such a manner that one will fall independently of the other or both may be made to adjust positively as selected by the control device.

In addition, an important feature of this hopper valve control arrangement is that it may be placed on top of or adjacent to any conventional conveyor delivery apparatus so that the valve feeds selectively and controllably directly onto the conveyor.

Other and further objects and advantages of my invention will become apparent upon reading the following specification taken in conjunction with the several figures of the drawings, wherein.

Figure 1:
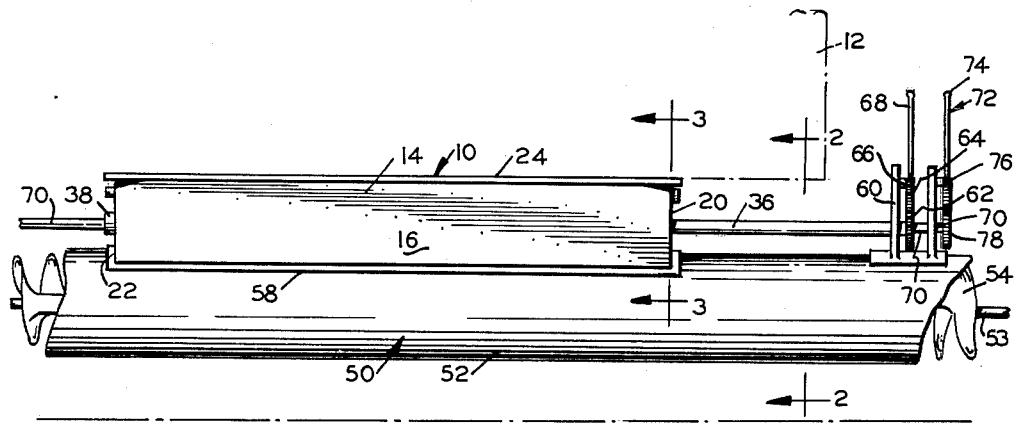
FIG. 1 is a side elevation view of a typical valve structure made in accordance with the present invention and mounted on top of a screw conveyor housing and delivery mechanism and attached to the bottom of a typical hopper shown diagrammatically in broken lines.
Figure 2:
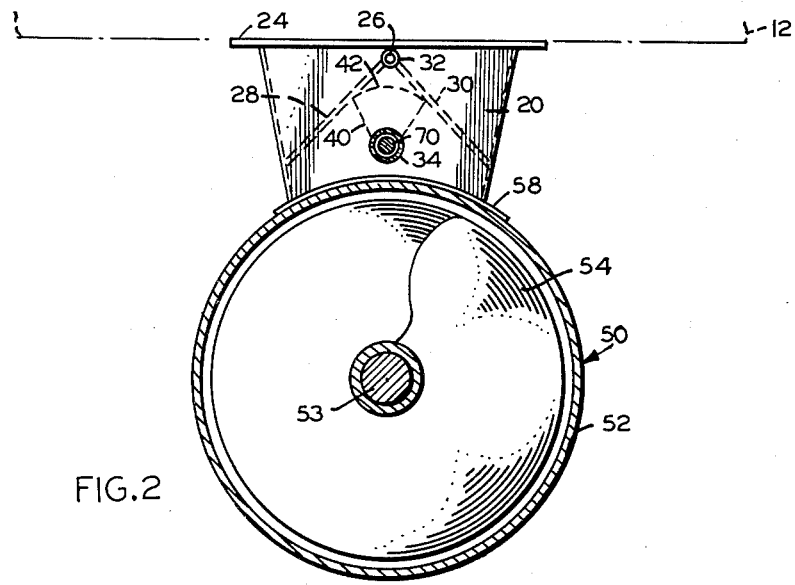
FIG. 2 is a cross-sectional view taken substantially along lines 2—2 in FIG. 1 and showing the right end elevation of the hopper valve structure of FIG. 1 and with the internal valve control mechanism shown in dotted lines.

Referring initially to FIGS. 1 and 2 of the drawing and then to the other figures of the drawings as the description progresses, the overall or general hopper valve structure itself is referred to as number 10 and is attached as shown in FIG. 1 to the open portion of the bottom of any sort of grain bin, hopper or storage device 12 which could also be a conventional tank car, truck car, cement conveyor or the like. Hopper 12 would be any sort of storage compartment having means therein, either gravity or otherwise, to deliver the storage commodities to the bottom of the bin adjacent the position of the valve 10. Valve 10 is attached to the storage compartment 12 by any suitable means, such as bolts, screws or otherwise, and valve 10 comprises an elongated valve housing or hopper-like arrangement 14 constructed from four plate members, there being two sloped, side plate members 16, 18, a front end plate member 20, and a rear end plate member 22. The end plates 20, 22 are tapered on the sides with respect to the elongated long plate members 16, 18 forming therewith a slope-sided valve housing. The top of the valve housing is formed with a projecting lip or flange periphery arrangement 24 forming a tight seal around the bottom opening in the storage structure 12.

Within the housing 14 substantially centrally located at the top thereof, there is an elongated shaft or rod 26 having movably attached thereto a pair of valve members or valve gate members 28, 30, each having a collar 32 thereon and these collars 32 interlock together about the pin 26. The pin 26 and two gates 28, 30 may be compared with a common door-hinge wherein the hinge plates are represented by the present gates 28, 30 and the hinge pintle or pin 32 is represented by the present pin 26, and the hinge plates interlock together with their collars 32 about the pin 26. Both gates 28, 30 are freely movable about the pin 26 and are held in place by means of the valve control structure to be described at this time.

Within the valve housing 14, substantially centrally and longitudinally thereof and substantially parallel to the rod 26, there is a large tubular control shaft 34 having the outward ends 36, 38 thereof extending from opposite end plates 20, 22 of the valve housing 14 and being rotatably movable therein. Shaft 34 has affixed thereto, as by welding, bolting or otherwise, cam control members or cam segment members or simply cams 40, each being a portion of a circular plate and having a portion of a circle as the outer cam face 42. As seen in FIG. 2, normally cam 40 is positioned in such a manner as to place the opposite sides of cam face 42 firmly and tightly in engagement with both of the gate members 28, 30, which extend outwardly and downwardly from the pin 26 closing the valve completely. However, by reference to the subsequent FIGURES 3 through 9 of the drawings, it will be seen how the cam 42 can be fine-controlled mechanically to selectively operate either or both of the gate members 28, 30.

As stated heretofore, it is contemplated that the valve pin 26 would be mounted on or very closely adjacent to a conveyor delivery mechanism which would deliver the commodity from the valve to whatever location is being used. A typical installation is shown in FIG. 1 represented generally by the number 50 and comprising a typical screw-type conveyor having a tubular housing 52 in which is mounted for rotation therein on a shaft 53 a large conveyor screw member 54, the function of which is to deliver a material through the blades of the screw forwardly thereof and outwardly and remotely to whatever station is desired. The top of the conveyor 50, at substantially the location 24, is open and the bottom of the valve 14 fits within and around this opening. Therefore, material which is delivered through either one of the gates 28, 30 will fall into the screw 54 to be delivered therefrom. In the present embodiment there is an attachment plate or flange 58 connecting the bottom of the valve 14 tightly into the opening 56 formed in the top of the screw conveyor 50.

Shaft 34 extends at its front end 36 thereof to a pillar block bearing structure 60 which supports the shaft thereon. Also mounted on the pillar block bearing support 60, which is firmly attached as by welding or otherwise on top of the screw conveyor 50, is a control mechanism for valve 14 comprising a gear 62 attached to the end of shaft 34 and which gear 62 is engaged by a segment control member 64 mounted on a stub shaft 66 supported on the pillar block 60. Segment 64 is formed with teeth around the periphery thereof which mesh with teeth in the gear member 62 and there is attached to segment 64 an operating handle member 68. Accordingly, rotating the handle member 68 about its shaft 66 in one direction rotates the gear 62 and the shaft 34 in one direction, and vice versa when the handle 68 is rotated in the other direction. This action is more fully and adequately described by reference to the FIGURES 3 through 10 of the drawings.

Figure 3:
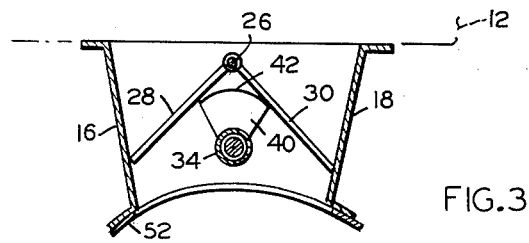
FIG. 3 is a cross-sectional view taken substantially along lines 3—3 in FIG. 1 and showing the interior of the hopper valve structure.
Figure 4:
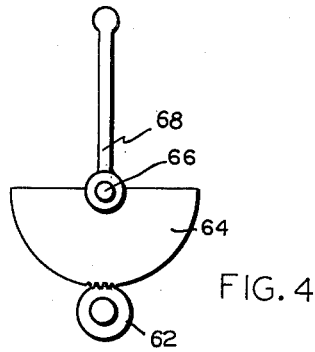
FIG. 4 is a diagrammatic view in elevation of the segment control gear mechanism shown on the right end of the hopper valve in FIG. 1 set to the valve position shown in FIG. 3.

In FIG. 3 the two gate members 28, 30 are shown in their normally fully closed position held firmly in place against the side of a respective side member 16, 18 by means of the cam surface 42 firmly engaging each of the gate members 28, 30 and forcing them against the sides 16, 18. In this position, the control handle 68 is straight up and down as shown in FIG. 4 and the control segment 66 is substantially in the center of its segment. In order to open one gate, for example gate 28, independently of the other gate, for example gate 30, reference is made to FIG. 5 wherein the handle 68 has been depressed counter-clockwise, thereby driving the segment counter-clockwise which drives the gear 62 clockwise, thereby rotating the shaft 34 and the cam 40 clockwise permitting gate 28 to drop to the position shown in FIG. 5 at the same time maintaining gate 30 firmly in place. It is pointed out that this action may be as gradual and as slow or fast as the operator wishes, depending upon the speed at which the handle 68 is turned. It is not necessary that the gate 28 be opened to the full position shown in FIG. 5, but it may be opened any increment between that shown in FIG. 3 and that shown in FIG. 5 and selectively controlled with fine control between those positions.

Figure 5:
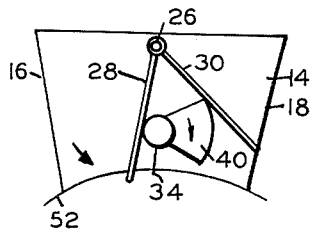
FIG. 5 is a diagrammatic view of the hopper valve control shown in FIG. 3 rotated to a different position to permit one of the gates to swing to full open position.
Figure 6:
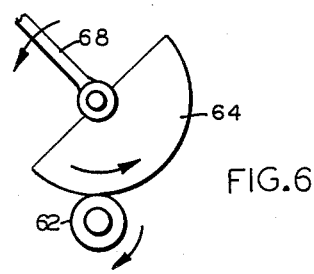
FIG. 6 is a diagrammatic view similar to the one shown in FIG. 4 and with the hopper valve control segment rotated to a different position to position the valve into the position shown in FIG. 5.
Figure 7:
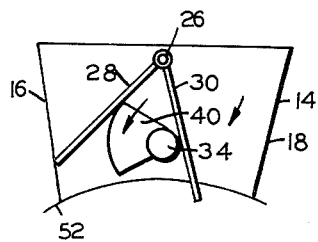
FIG. 7 is a diagrammatic view of the device shown in FIG. 3 and with the cam shaft rotated to shifted position to open the other gate from that shown in FIG. 5.
Figure 8:
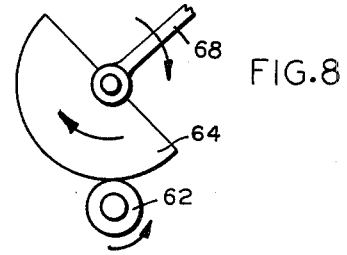
FIG. 8 is a diagrammatic view similar to the one shown in FIG. 6 but with the segment completely shifted to actuate the valve cam to the position shown in FIG. 7.
Figure 9:
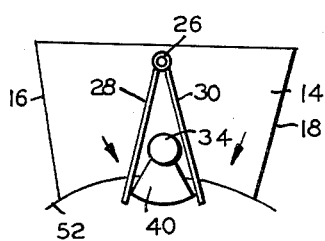
FIG. 9 is a diagrammatic view similar to the one shown in FIGS. 5 and 7 but with the cam shaft and cam rotated to a downward position permitting both gates to swing freely open.

If, on the other hand, it is desired to open the other gate 30, say from the position shown in FIG. 3, then the handle 68 is pushed clockwise which moves the segment 66 clockwise thereby turning the gear 62 counterclockwise which rotates the shaft 34 and cam 40 counterclockwise from the position shown in FIG. 3 to that shown in FIG. 7 which is exactly the opposite from the position shown in FIG. 5. In this position, gate 30 is wide-open and in the same manner as described in connection with gate 28 any increment of opening positively controlled may be selected between the fully closed position in FIG. 3 and the fully opened position in FIG. 7 and the speed of this depends upon the speed of actuating the handle 68.

Figure 10:
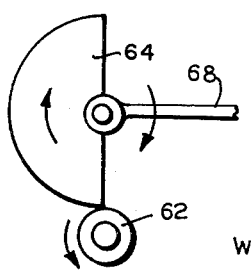
FIG. 10 is a diagrammatic view of the control segment shown in FIG. 8 rotated to place the cam shaft and cams in the position shown in FIG. 9.

When it is desired to open both gates 28 and 30 from any position of the lever 68, it is necessary only that the handle 68 be pushed fully 90° from its normal vertical position to either side thereby dropping the cam 40 to its fullest and lowermost position whereby the two gates 28, 30 are permitted to fall wide open. For example, in FIG. 9, the two gates 28, 30 are shown in fully opened position, and in this position it is noted that the handle in FIG. 10 is 90° to the normally closed position shown in FIG. 4. The same action would have occurred if the handle had been rotated completely to the other side. If it is wanted from the standpoint of control, the gates 28, 30 may be opened to the fully opened position of FIG. 9 by first going through the step of opening only one of the gates 28, 30, as shown in either of the positions of FIGS. 5 and 6 or FIGS. 7 and 8, wherein one of the gates 28, 30, have been opened first and then the cam is moved to the lowermost position shown in FIG. 9, at which position both gates are fully opened. This selective and positive control allows the utmost control and timing of the commodity from the bin storage 12 to the conveyor apparatus 50 and permits the timing and handling of the material to be governed according to the desired flow.

As seen in FIGS. 1 and 2, the present invention is of additional value for the reason that more than one unit 14 may be placed on the bottom of the bin storage 12 and in fact as many units as desired may be placed in longitudinal arrangement or, if desired, several longitudinal arrangements may be placed parallel across the bottom of such a storage bin 12. To illustrate this arrangement, in FIG. 1 there is shown a second shaft 70 passing from the outward end of shaft 36 through the shaft 36, through valve 10 and outwardly from the inward end 38 of shaft 36 and being freely movable therein. This additional control shaft 70 is connected to a second control apparatus 72 identical in arrangement to the control apparatus 66, 68, and consisting of a handle 74 operating a segment 76 which actuates a gear 78 connected on the shaft 70. Shaft 70 in turn would be connected to the second valve arrangement attached on top of the screw conveyor 50 in line with the first valve arrangement 14. With this arrangement, shaft 70 would serve the same function in the second valve arrangement as does the shaft 34 in the valve arrangement 14; or, in other words, shaft 70 is the longitudinal control shaft for the cam operators in the second hopper valve structure. This structure is not shown in the drawing since it is identical in all other respects with the hopper valve structure 14 shown in FIG. 1. It is obvious by a reading of this specification and drawings that subsequent valve structures may be operated through the means of other shafts extending through shaft 70 which in turn would have a shaft extending through them for as many lineally arranged valve structures as is desired. Since the valve structures all have separate operating mechanisms and are controlled from separate handles 68, 74, they have independent operation and may be governed and controlled selectively and positively from the same general control station at the handle 66, 74. Accordingly, one operator who estimates and controls the flow of the material from the bin storage 12 may manually operate the levers or handles 68, 74 to open and close the respective gates 28, 30 and the gates in the other hopper valve structure in accordance with the desired flow and the speed of delivery required.

While only one cam 40 is apparent from the drawing in FIG. 2, it is pointed out that as many of the cams 40 may be utilized in the same valve 14 as required or desired from a design standpoint to give the amount of force and strength wanted to hold the gates 28, 30 in place. This would be a matter of anticipating how much weight would be expected to press upon the gates 28, 30 at various times and also the proximate strength of the shaft 34 and the cams 40 so as to determine how many or if more than one of these cam members 40 is required for this purpose. Such cams 40 of course, would be positioned in the same position with respect to each other on the shaft 34 and would all act simultaneously against the gates 28, 30 in opening or closing them.

While I have shown and described a particular embodiment of my invention together with particular illustrations of the operation thereof, it is to be understood that this is for illustrative purposes only and is not to be construed in any way as any sort of limitation on the scope thereof since various modifications, eliminations, changes, substitutions, variations, and deviations may be made from the invention shown and described herein without departing from the scope of my invention as defined in the appended claims.

I claim:

1. In a valve control structure of the class described for operation on and between a bin storage and a delivery mechanism, a valve housing having tapered side walls on each side thereof and having end closure members forming a housing open at the top and bottom thereof, a pair of swingable flat-bottomed gate members each supported on one side within said housing and each being independently operable of the other with the other side movable to close a portion thereof, said gate members being operable together to close completely the entire housing intermediate the top and bottom thereof, a longitudinal cam shaft running lengthwise of said hopper valve on one side of said gate members, a cam member attached on said longitudinal cam shaft and having a cam surface operable to engage selectively either one or both of the flat bottoms of said gate members to close same simultaneously or selectively to operate one or the other thereof while engaging the other thereof to maintain it in closed position, and means on said valve structure for operating said cam shaft to move said cam shaft selectively 360° thereby to control either or both of said gates to open same selectively either simultaneously or independently and in a selected amount.

2. The device in claim 1 wherein said cam shaft is hollow and wherein there is a second and identical hopper valve control structure attached in line with said hopper valve housing, and a second control shaft extends through said hollow cam shaft for controlling said second valve.

3. In a valve structure of the class described for attachment on and operation between a bin storage and a delivery mechanism, an elongated valve housing comprising a pair of sidewalls open at the top and bottom thereof and therebetween and having end closure plates attached thereto at each end thereof forming a hopper valve housing open at the top and the bottom along the elongated axis thereof, a support substantially at the top of the inside of said housing, a pair of gate members each supported on said support and each extending from said shaft to a respective side of said housing, said gate members each being flat-bottomed and extending the full length of said housing from one end to the other end thereof and together in one position thereof completely closing said housing intermediate the top opening and the bottom opening therein, a longitudinal control shaft supported on and attached between said end plates of said housing substantially in parallel relationship with said other shaft and below said gate members, a cam control member affixed on said control shaft and having a curved cam surface thereon engageable with the flat bottoms of said gate members simultaneously in one position thereof to close both of said gate members by forcing them respectively against a respective side wall, said cam member being operable 360° in a selective clockwise or counter-clockwise direction to cause one of said gate members to be released whereby it will fall open by gravity and by reaction to the force of the material supported thereabove, said cam being operable 360° in the other direction thereof to selectively open the other of said gates while holding said first gate in closed position and said cam member being operable in another position thereof to permit both of said gate members to open.

4. In a valve structure of the class described for attachment on and operation between a bin storage and a delivery mechanism, an elongated valve housing comprising a pair of sidewalls open at the top and bottom thereof and therebetween and having end closure plates attached thereto at each end thereof forming a hopper valve housing open at the top and the bottom along the elongated axis thereof, a gate rod member attached on and extending between said end closure members substantially at the top of the inside of said housing, a pair of flat-bottomed gate members each hinged to said shaft and each extending from said shaft to a respective side of said housing, said gate members each being the full length of said housing from one end to the other end thereof and together in one position thereof completely closing said housing intermediate the top opening and the bottom opening therein, a longitudinal control shaft supported on and attached between said end plates of said housing substantially in parallel relationship with said other shaft and below said gate members, a cam control member affixed on said control shaft and having a curved cam surface thereon engageable with the flat bottoms of said gate members simultaneously in one position thereof to close both of said gate members by forcing them respectively against a respective side wall, said cam member being operable 360° in a selective clockwise or counter-clockwise direction to cause one of said gate members to be released whereby it will fall open by gravity and by reaction to the force of the material supported thereabove, said cam being operable in the other direction thereof to selectively open the other of said gates while holding said first gate in closed position and said cam member being operable 360° in another position thereof to permit both of said gate members to open.

5. In a valve structure of the class described for attachment on and operation between a bin storage and a delivery mechanism, an elongated valve housing comprising a pair of tapered sidewalls open at the top and bottom thereof and therebetween and having end closure plates attached thereto at each end thereof forming a hopper valve housing open at the top and the bottom along the elongated axis thereof, a gate support substantially at the top of the inside of said housing, a pair of flat-bottomed gate members each attached on said support and each extending from said support to a respective side of said housing, said gate members each being the full length of said housing from one end to the other end thereof and together in one position thereof completely closing said housing intermediate the top opening and the bottom opening therein, a longitudinal control shaft supported on and attached between said end plates of said housing substantially in parallel relationship with said other shaft and below said gate members, a cam control member affixed on said control shaft and having a curved cam surface thereon engageable with the flat bottoms of said gate members simultaneously in one position thereof to close both of said gate members by forcing them respectively against a respective side wall, said cam member being operable 360° in a selective clockwise or counter-clockwise direction to cause one of said gate members to be released whereby it will fall open by gravity and by reaction to the force of the material supported thereabove, said cam being operable 360° in the other direction thereof to selectively open the other of said gates while holding said first gate in closed position and said cam member being operable in another position thereof to permit both of said gate members to open, said cam control shaft extending beyond said end plate, and a control member for said cam shaft.

6. In a valve structure of the class described for attachment on and operation between a bin storage and a delivery mechanism, an elongated valve housing comprising a pair of tapered sidewalls open at the top and bottom thereof and therebetween and having end closure plates attached thereto at each end thereof forming a hopper valve housing open at the top and the bottom along the elongated axis thereof, a gate rod member attached on and extending between said end closure members substantially at the top of the inside of said housing, a pair of flat-bottomed gate members each attached on said shaft and each extending from said shaft to a respective side of said housing, said gate members each being the full length of said housing from one end to the other end thereof and together in one position thereof completely closing said housing intermediate the top opening and the bottom opening therein, a longitudinal control shaft supported on and attached between said end plates of said housing substantially in parallel relationship with said other shaft and below said gate members, a cam control member affixed on said control shaft and having a curved cam surface thereon engageable with the flat bottoms of said gate members simultaneously in one position thereof to close both of said gate members by forcing them respectively against a respective side wall, said cam member being operable 360° in a selective clockwise or counter-clockwise direction to cause one of said gate members to be released whereby it will fall open by gravity and by reaction to the force of the material supported thereabove, said cam being operable 360° in the other direction thereof to selectively open the other of said gates while holding said first gate in closed position and said cam member being operable in another position thereof to permit both of said gate members to open, said cam control shaft extending beyond said end plate, a control member supported adjacent said hopper valve and having a control segment attached thereto, said control segment having teeth therein, a gear fastened on said control shaft in meshing engagement with said segment whereby movement of said segment rotates said gear, by virtue of with which movement of said segment in one direction actuates said cam member in one direction and whereby movement of said segment in the other direction moves said cam member in the opposite direction from said first movement.

7. The device in claim 6 wherein said control shaft is hollow and there are additional valve housings and complete valve structures supported in line with said first valve housing to receive material therethrough independently of each other, and the control shafts for said additional valves extending through each other.

References Cited in the file of this patent

UNITED STATES PATENTS

| | | |
|---|---|---|
| 1,066,547 | Summa | July 8, 1913 |
| 2,209,115 | Fitzgerald | July 23, 1940 |
| 2,769,403 | Cox | Nov. 6, 1956 |